US010372990B2

(12) United States Patent
Cardonha et al.

(10) Patent No.: US 10,372,990 B2
(45) Date of Patent: Aug. 6, 2019

(54) SYSTEM AND METHOD FOR IDENTIFICATION OF PERSONAL THERMAL COMFORT

(71) Applicant: INTERNATIONAL BUSINESS MACHINES CORPORATION, Armonk, NY (US)

(72) Inventors: Carlos Henrique Cardonha, São Paulo (BR); Andrea Britto Mattos Lima, São Paulo (BR); Stefany Mazon, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 218 days.

(21) Appl. No.: 15/073,813

(22) Filed: Mar. 18, 2016

(65) Prior Publication Data

US 2017/0268793 A1    Sep. 21, 2017

(51) Int. Cl.
*G06K 9/00* (2006.01)
*F24F 11/30* (2018.01)
(Continued)

(52) U.S. Cl.
CPC .......... *G06K 9/00711* (2013.01); *F24F 11/30* (2018.01); *F24F 11/62* (2018.01);
(Continued)

(58) Field of Classification Search
CPC ............... F24F 11/0012; F24F 11/0015; F24F 11/0034; G05B 13/021; G06K 9/00361; G06K 9/00711; G06T 7/0081
(Continued)

(56) References Cited

U.S. PATENT DOCUMENTS 3,217,788 A   11/1965 Adam
4,585,162 A    4/1986 Evans
(Continued)

FOREIGN PATENT DOCUMENTS

CN    85203817    5/1986
CN    87207571    8/1988
(Continued)

OTHER PUBLICATIONS

Murphy, Kate, "Enduring Summer's Deep Freeze" The New York Times, published Jul. 4, 2015 [online at the internet: <URL: http://www.nytimes.com/2015/07/05/sunday-review/enduring-summers-deep-freeze.html?_r=2>]. [Last Visited Mar. 14, 2016].
(Continued)

*Primary Examiner* — Robert A Cassity
(74) *Attorney, Agent, or Firm* — F. Chau & Associates, LLC

(57) ABSTRACT

A method for temperature control includes acquiring image data, and analyzing the image data to identify one or more individuals within the image data. A level of thermal comfort is estimated for each of the identified individuals based on the image data. The determined level of thermal comfort indicates whether each individual appears to be feeling too hot, appears to be feeling too cold or appears to be feeling satisfied with an ambient temperature. An air-conditioning unit or a heating unit is controlled based on the estimation of the level of thermal comfort for each of the identified individuals.

22 Claims, 7 Drawing Sheets

(51) Int. Cl.
   *F24F 11/62* (2018.01)
   *G06T 7/11* (2017.01)
   *F24F 110/10* (2018.01)
   *F24F 110/20* (2018.01)
   *F24F 120/10* (2018.01)

(52) U.S. Cl.
   CPC ............ *G06K 9/00369* (2013.01); *G06T 7/11* (2017.01); *F24F 2110/10* (2018.01); *F24F 2110/20* (2018.01); *F24F 2120/10* (2018.01)

(58) Field of Classification Search
   USPC ........................................................ 700/278
   See application file for complete search history.

(56) References Cited

U.S. PATENT DOCUMENTS

| | | | |
|---|---|---|---|
| 4,601,329 | A | 7/1986 | Sheridan |
| 4,890,932 | A | 1/1990 | Kobayashi et al. |
| 5,346,129 | A | 9/1994 | Shah et al. |
| 5,805,718 | A | 9/1998 | Inoshiri et al. |
| 2009/0101725 | A1 | 4/2009 | Dolan et al. |
| 2009/0318773 | A1* | 12/2009 | Jung ................. G16H 10/20 600/300 |
| 2011/0205366 | A1 | 8/2011 | Enohara et al. |
| 2013/0144470 | A1 | 6/2013 | Ricci |
| 2014/0039691 | A1* | 2/2014 | Gupta ................. F24F 11/0001 700/278 |
| 2014/0148706 | A1 | 5/2014 | Van Treeck et al. |
| 2015/0028114 | A1* | 1/2015 | Rosen ................. F24F 11/0034 236/51 |
| 2015/0338117 | A1* | 11/2015 | Henneberger ......... G05B 15/02 700/276 |
| 2016/0258643 | A1* | 9/2016 | Cheatham, III ....... F24F 11/006 |

FOREIGN PATENT DOCUMENTS

| | | |
|---|---|---|
| CN | 101881488 | 11/2010 |
| CN | 103335380 | 10/2013 |
| CN | 103673227 | 3/2014 |
| CN | 103727593 | 4/2014 |
| EP | 0742883 | 11/1996 |
| EP | 1543275 | 6/2005 |
| EP | 2362351 | 4/2013 |
| WO | WO 95/22725 | 8/1995 |
| WO | WO 0169341 | 9/2001 |
| WO | WO 02/21231 | 3/2002 |
| WO | WO 2004/014169 | 2/2004 |
| WO | WO 2006/095763 | 9/2006 |
| WO | WO 2015/014229 | 2/2015 |

OTHER PUBLICATIONS

Buhari, Suhaila M., et al. "Fuzzy based room temperature control by integrating sensors and cameras with a grid." Computational Intelligence for Communication Systems and Networks (CIComms), 2013 IEEE Symposium on. IEEE, 2013.

Thananunsophon, Ketsupich, et al. "Community monitoring and security using an intelligent camera in EAT smart grids." Procedia Engineering 8 (2011): 332-336.

* cited by examiner ers SYSTEM AND METHOD FOR
IDENTIFICATION OF PERSONAL
THERMAL COMFORT

BACKGROUND

Exemplary embodiments of the present invention relate to a system and method for identification of thermal comfort. More particularly, exemplary embodiments of the present invention relate to a system and method for identification of personal thermal comfort based on image processing for seating place allocation and climate control adjustment.

Generally, a human body is maintained at a relatively constant temperature. However, individuals are often placed in rooms or other spaces that are either too hot or too cold to maintain personal thermal comfort level based on individuals personal experience of temperature. Different groups of individuals may have different reactions to certain temperatures and the different groups of people may experience particular levels of personal thermal comfort or discomfort that is not readily detectable by traditional thermal sensors or thermal detection processes. For example, a number of people working in a particular room or a particular space may experience different levels of personal thermal comfort or discomfort with respect to the temperature in the room It may be desirable to allocate different groups of individuals having different thermal comfort levels to different rooms or spaces. It may also be desirable to adjust the heat or air conditioning output of one or more heating or air conditioning sources to account for the personal thermal comfort of individuals in a particular space.

SUMMARY

Exemplary embodiments of the present invention provide a method for temperature control including acquiring image data, and analyzing the image data to identify one or more individuals within the image data. A level of thermal comfort is estimated for each of the identified individuals based on the image data. The determined level of thermal comfort indicates whether each individual appears to be feeling too hot, appears to be feeling too cold or appears to be feeling satisfied with an ambient temperature. An air-conditioning unit or a heating unit is controlled based on the estimation of the level of thermal comfort for each of the identified individuals.

According to an exemplary embodiment of the present invention the image data may be acquired using one or more cameras.

According to an exemplary embodiment of the present invention the method for temperature control may include acquiring humidity data. The estimating the level of thermal comfort for each of the identified individuals may be performed based on the acquired humidity data in addition to the acquired image data.

According to an exemplary embodiment of the present invention the humidity data may be used to determine or confirm whether the individual is perspiring.

According to an exemplary embodiment of the present invention estimating the level of thermal comfort for each of the identified individuals based on the image data may include segmenting the individual from the image data. Clothed surfaces and skin-exposed surfaces on the individual may be differentiated. A level of skin exposure of the individual may be calculated based on the differentiation between the clothed surfaces and the skin-exposed surfaces of the individual. It may be determined whether the individual appears to be dressed for a warm or cool temperature based on the calculated level of skin exposure. The level of thermal comfort of the individual may be estimated based on the determination as to whether the individual appears to be dressed for warm or cold temperature.

According to an exemplary embodiment of the present invention estimating the level of thermal comfort for each of the identified individuals based on the image data may include segmenting the individual from the image data. Types of clothing garments being worn by the individual may be determined from within the segmented image data of the individual. It may be determined whether the individual appears to be dressed for a warm or cool temperature based on the identified types of clothing garments being worn by the individual. The level of thermal comfort of the individual may be estimated based on the determination as to whether the individual appears to be dressed for warm or cold temperature.

According to an exemplary embodiment of the present invention estimating the level of thermal comfort for each of the identified individuals based on the image data may include segmenting the individual from the image data. Clothed surfaces and skin-exposed surfaces on the individual may be differentiated. The skin-exposed surfaces of the individual may be examined to identify the presence of perspiration or cutis anserine/horripilation. The level of thermal comfort of the individual may be estimated based on the identification of perspiration or cutis anserine/horripilation.

According to an exemplary embodiment of the present invention estimating the level of thermal comfort for each of the identified individuals based on the image data may include segmenting the individual from the image data. The segmentation of the individual over a plurality of image frames may be analyzed. One or more observed actions of the individual may be characterized based on the analysis of the segmentation of the individual over the plurality of image frames. It may be determined whether any of the one or more observed actions of the individual are indicative of the individual feeling either too hot or too cold. The level of thermal comfort of the individual may be estimated based on the determination as to whether the individual appears to be feeling either too hot or too cold.

According to an exemplary embodiment of the present invention controlling the air-conditioning unit or the heating unit based on the estimation of the level of thermal comfort for each of the identified individuals may include calculating a group comfort score by averaging the level of individual thermal comfort for all of the one or more individuals identified within the image data. It may be determined whether the group comfort score is below a predetermined low threshold indicating that the one or more individuals are, on-average, feeling too cold or whether the group comfort score is above a predetermined high threshold indicating that the one or more individuals are, on-average, feeling too hot. The air-conditioning unit or the heating unit may be controlled to raise the ambient temperature when it is determined that the group comfort score is below the predetermined low threshold, or controlling the air-conditioning unit or the heating unit to lower the ambient temperature when it is determined that the group comfort score is above the predetermined high threshold.

Exemplary embodiments of the present invention provide a method for temperature control within an environment including acquiring temperature data at a plurality of different points within the environment. A temperature distribution pattern within the environment including at least one region of relatively high temperature and at least one region of relatively low temperature is determined. Image data is acquired. The image data is analyzed to identify an individual within the image data. A level of thermal comfort is estimated for the identified individual based on the image data, and the determined level of thermal comfort indicating whether the individual appears to be feeling too hot, appears to be feeling too cold or appears to be feeling satisfied with an ambient temperature. The individual is reassigned to a space within the at least one region of relatively high temperature when the level of thermal comfort of the individual indicates that the individual appears to be feeling too cold, or the individual is reassigned to a space within the at least one region of relatively low temperature when the level of thermal comfort of the individual indicates that the individual appears to be feeling too hot.

According to an exemplary embodiment of the present invention the method for temperature control may include controlling an air-conditioning unit or a heating unit based on the estimation of the level of thermal comfort for the identified individual.

According to an exemplary embodiment of the present invention controlling the air-conditioning unit or the heating unit based on the estimation of the level of thermal comfort for the identified individual may include determining whether the level of thermal comfort is below a predetermined low threshold indicating that the individual is feeling too cold or whether the level of thermal comfort is above a predetermined high threshold indicating that the individual is feeling too hot. The air-conditioning unit or the heating unit may be controlled to raise the ambient temperature when it is determined that the level of thermal comfort is below the predetermined low threshold, or the air-conditioning unit or the heating unit may be controlled to lower the ambient temperature when it is determined that the level of thermal comfort is above the predetermined high threshold.

According to an exemplary embodiment of the present invention reassigning the individual may include selecting a new workspace for the individual from among a list of available workspaces.

According to an exemplary embodiment of the present invention reassigning the individual may include selecting a new workspace for the individual and reassigning a second individual, already assigned to the new workspace, to another workspace.

According to an exemplary embodiment of the present invention the image data may be acquired using one or more cameras.

According to an exemplary embodiment of the present invention the method for temperature control may include acquiring humidity data. The estimating the level of thermal comfort for the identified individual may be performed based on the acquired humidity data in addition to the acquired image data.

According to an exemplary embodiment of the present invention the humidity data may be used to determine or confirm whether the individual is perspiring.

Exemplary embodiments of the present invention provide a method for reassigning seating for individuals and controlling ambient temperatures within an environment including receiving a seating chart for a plurality of individuals within the environment. Temperature data is acquired at a plurality of different points within the environment. A temperature distribution pattern is determined within the environment including at least one region of relatively high temperature and at least one region of relatively low temperature. How control of an air-conditioning unit or a heating unit affects the temperature distribution pattern is determined. Image data is acquired. The image data is analyzed to identify each of the plurality of individuals within the seating chart. A level of thermal comfort is estimated for each of the identified plurality of individuals based on the image data, and the determined level of thermal comfort indicating whether each of the identified plurality of individuals appears to be feeling too hot, appears to be feeling too cold or appears to be feeling satisfied with an ambient temperature. An optimized heating/cooling plan is generated. Generating the optimized heating/cooling plan includes determining how the air-conditioning unit or the heating unit is to be controlled based on the determined temperature distribution pattern and the determination as to how the control of the air-conditioning unit or the heating unit affects the temperature distribution pattern. A modified seating chart is generated by re-assigning each of the plurality of individuals to an optimal work space based on the corresponding level of estimated thermal comfort for the individual and a location of each work space with respect to the temperature distribution pattern.

According to an exemplary embodiment of the present invention estimating the level of thermal comfort for each of the identified individuals based on the image data may include segmenting the individual from the image data. Clothed surfaces and skin-exposed surfaces on the individual may be differentiated. A level of skin exposure of the individual may be calculated based on the differentiation between the clothed surfaces and the skin-exposed surfaces of the individual. It may be determined whether the individual appears to be dressed for a warm or cool temperature based on the calculated level of skin exposure. The level of thermal comfort of the individual may be estimated based on the determination as to whether the individual appears to be dressed for warm or cold temperature.

According to an exemplary embodiment of the present invention estimating the level of thermal comfort for each of the identified individuals based on the image data may include segmenting the individual from the image data. Types of clothing garments being worn by the individual may be identified from within the segmented image data of the individual. It may be determined whether the individual appears to be dressed for a warm or cool temperature based on the identified types of clothing garments being worn by the individual. The level of thermal comfort of the individual may be estimated based on the determination as to whether the individual appears to be dressed for warm or cold temperature.

According to an exemplary embodiment of the present invention estimating the level of thermal comfort for each of the identified individuals based on the image data may include segmenting the individual from the image data. Clothed surfaces and skin-exposed surfaces on the individual may be differentiated. The skin-exposed surfaces of the individual may be examined to identify the presence of perspiration or cutis anserine/horripilation. The level of thermal comfort of the individual may be estimated based on the identification of perspiration or cutis anserine/horripilation.

According to an exemplary embodiment of the present invention estimating the level of thermal comfort for each of the identified individuals based on the image data may include segmenting the individual from the image data. The segmentation of the individual over a plurality of image frames may be analyzed. One or more observed actions of the individual may be characterized based on the analysis of the segmentation of the individual over the plurality of image frames. It may be determined whether any of the one or more observed actions of the individual are indicative of the individual feeling either too hot or too cold. The level of thermal comfort of the individual may be estimated based on the determination as to whether the individual appears to be feeling either too hot or too cold.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION

Figure 1:
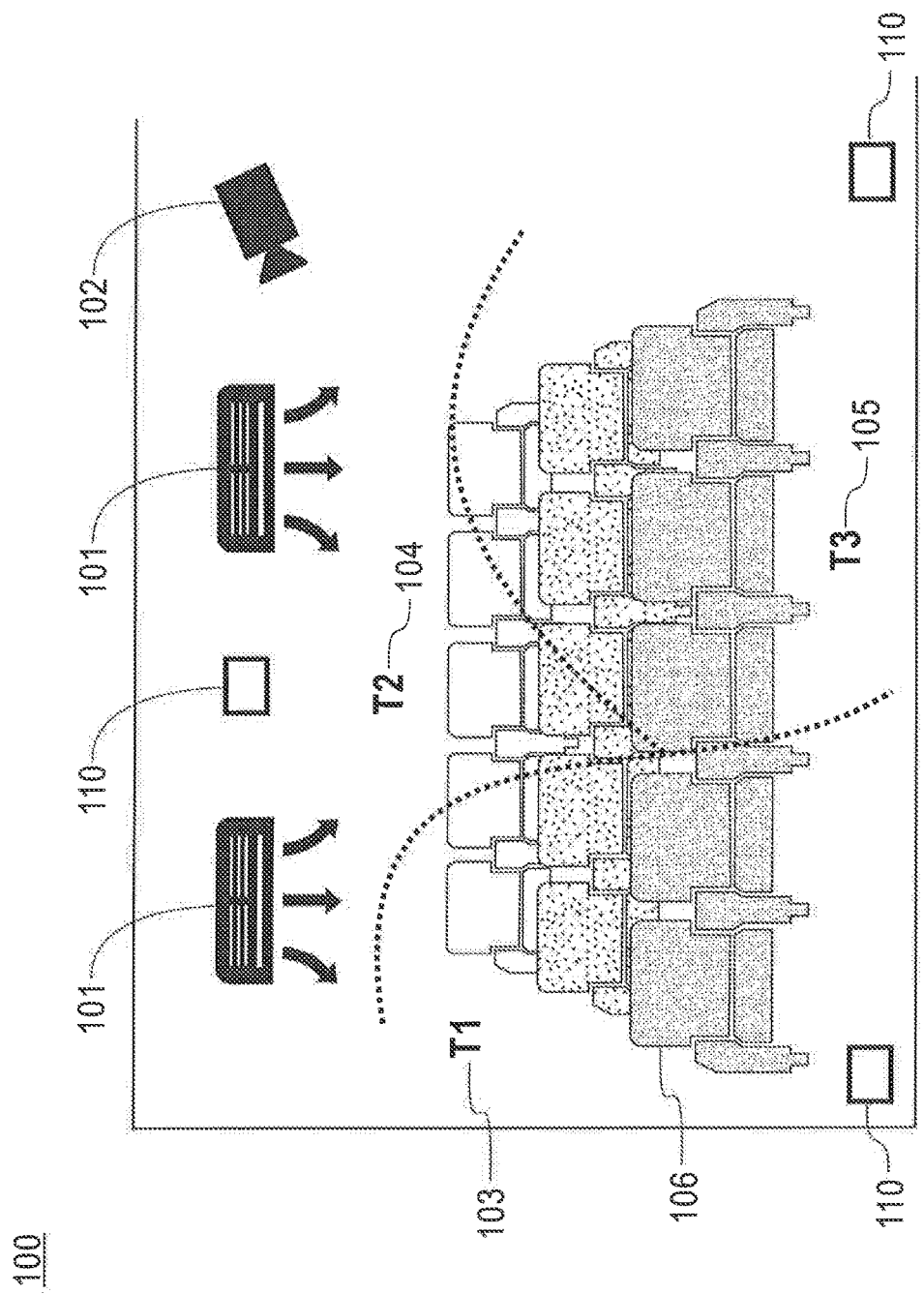
FIG. 1 illustrates a thermal environment according to an exemplary embodiment of the present invention.

A human body is maintained at a relatively constant temperature. However, individuals may occupy rooms or other spaces that are either too hot or too cold to maintain a personal thermal comfort level based on individuals' personal experience of temperature, or based on the clothing or attire the person is wearing. Different individuals or groups of individuals may have different reactions or tolerances to certain temperatures and the different groups of people may experience particular levels of personal thermal comfort or discomfort in a particular room or space. For example, a number of people working in a particular room or a particular space may experience different levels of personal thermal comfort or discomfort with respect to the temperature in the room. According to exemplary embodiments of the present invention, individuals having different thermal comfort levels may be assigned or reassigned to appropriate seating based on their individual level of thermal comfort. According to exemplary embodiments of the present invention, the temperatures of rooms, spaces, or areas within rooms or spaces may be modified to correspond with the personal thermal comfort of the individuals occupying such areas.

Exemplary embodiments of the present invention will be described more fully hereinafter with reference to the accompanying drawings. Like reference numerals may refer to like elements throughout the specification and drawings.

Figure 2:
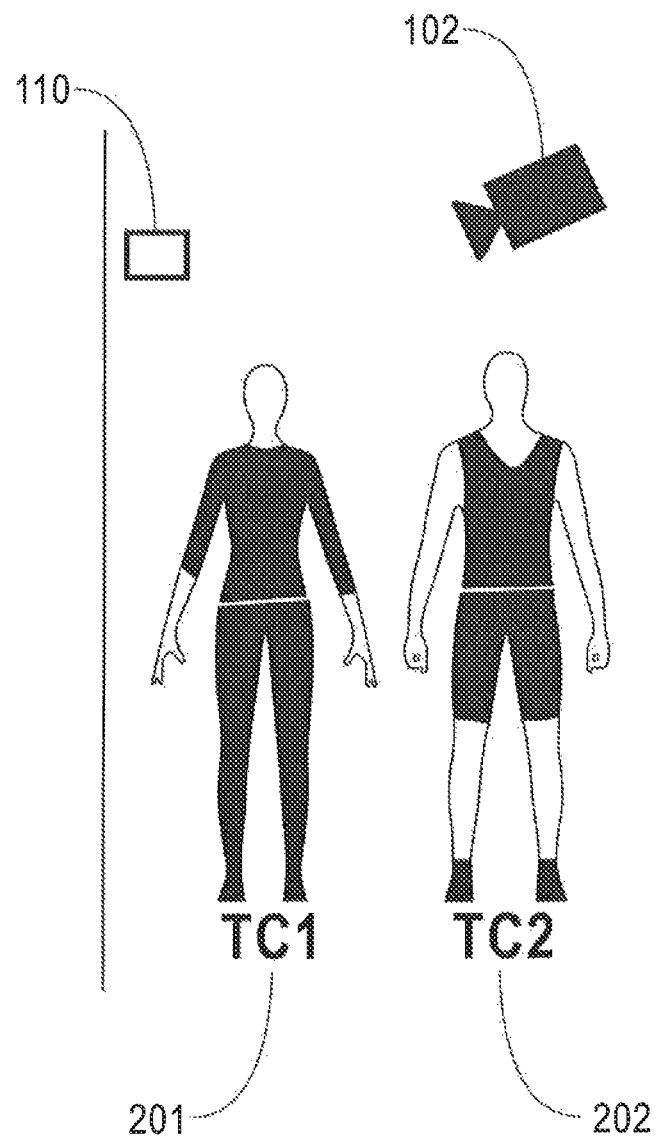
FIG. 2 illustrates individuals having personal thermal comfort levels according to an exemplary embodiment of the present invention.
Figure 3:
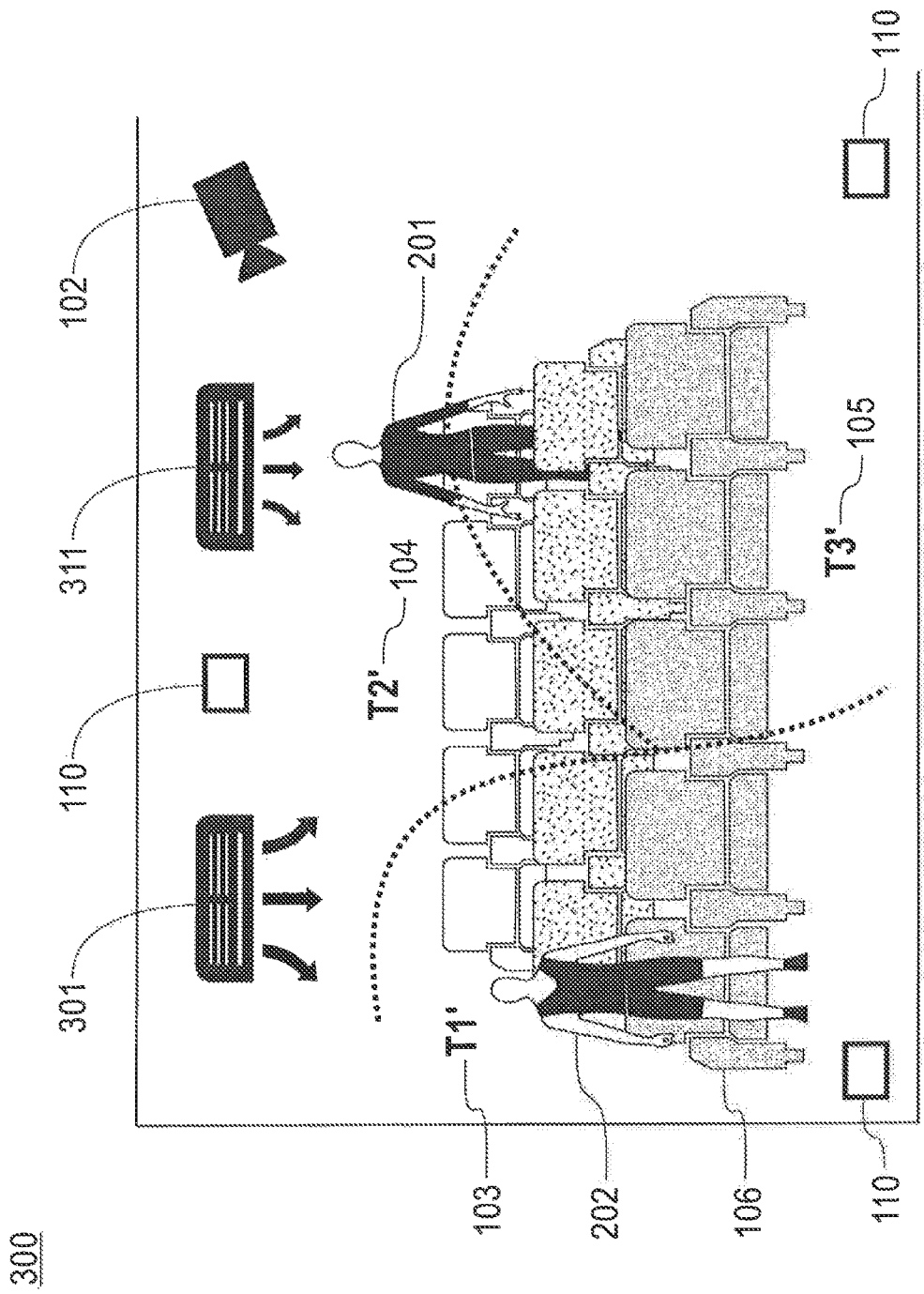
FIG. 3 illustrates individuals occupying areas of a thermal environment according to an exemplary embodiment of the present invention.

FIG. 1 illustrates a thermal environment according to an exemplary embodiment of the present invention. FIG. 2 illustrates individuals having personal thermal comfort levels according to an exemplary embodiment of the present invention. FIG. 3 illustrates individuals occupying areas of a thermal environment according to an exemplary embodiment of the present invention.

Referring to FIGS. 1 to 3, a thermal environment 100 may include a plurality of thermal regions (e.g., a first thermal region 103, a second thermal region 104, and a third thermal region 105). The thermal environment 100 may include one or more air conditioning (A/C) or heating units 101. The thermal environment 100 may include one or more cameras 102 and/or one or more thermal comfort sensors 110. Each thermal region may include one or more seating spaces 106. The one or more seating spaces 106 according to an exemplary embodiment of the present invention may be a workspace or a workstation.

According to an exemplary embodiment of the present invention, each thermal region may include one or more cameras 102 and/or one or more thermal comfort sensors 110.

According to an exemplary embodiment of the present invention, one or more individuals (e.g., a first individual 201 and/or a second individual 202) may occupy each of the thermal regions. For example, the first individual 201 may occupy the first thermal region 103 and the second individual 202 may occupy the third thermal region 105.

Referring to FIGS. 1 and 3, a thermal environment 300 may include a plurality of thermal regions (e.g., the first thermal region 103, the second thermal region 104, and the third thermal region 105). The thermal environment 300 may include one or more air A/C or heating units 101. The thermal environment 101 may include one or more cameras 102 and/or one or more thermal comfort sensors 110. Each thermal region may include one or more seating spaces 106. The one or more seating spaces 106 according to an exemplary embodiment of the present invention may be a workspace or a workstation.

According to an exemplary embodiment of the present invention, each thermal region may include one or more cameras 102 and/or one or more thermal comfort sensors 110. The one or more cameras 102 may capture video, still images, or a combination of video and still images. The one or more cameras 102 may include still image cameras, moving image cameras, black and white cameras, color cameras, night vision cameras, and/or low light cameras. The cameras 102 may capture an image having data regarding thermal output of individuals or areas in a space, and/or an image having data regarding a temperature in different areas within a space. However, exemplary embodiments of the present invention need not make use of any cameras other than standard image cameras, such as security cameras, web cams, and the like.

According to an exemplary embodiment of the present invention, the thermal comfort sensors 110 may include thermal imaging sensors, or temperature sensors for detecting temperature or relative heat or cold levels in areas within a space.

The one or more cameras 102 and/or the one or more thermal comfort sensors 110 may detect, for example, through various computer vision techniques, whether a particular individual is sweating or shivering, and may detect a level of clothing or attire that an individual is wearing, as described below in more detail.

According to an exemplary embodiment of the present invention, the thermal comfort sensors 110 may include movement sensors used to detect shivering, which may be an indication of an individual feeling too cold. The thermal comfort sensors 110 may include humidity sensors used to detect sweating, which may be an indication that an individual is feeling too warm.

According to an exemplary embodiment of the present invention, one or more images may be captured (e.g., by the one or more cameras 102) and the images may include thermal data, shivering/sweating data, and/or clothing/attire data which is analyzed to determine personal thermal comfort, as described below in more detail.

According to an exemplary embodiment of the present invention, the cameras 102 may be infrared cameras, or cameras including an infrared detector detecting a temperature of an area in a space, or thermal output from individuals occupying the space. However, exemplary embodiments of the present invention are not limited thereto.

According to an exemplary embodiment of the present invention, one or more individuals (e.g., a first individual 201 and/or a second individual 202) may occupy each of the thermal regions. For example, the first individual 201 may occupy the first thermal region 103 and the second individual 202 may occupy the third thermal region 105.

According to an exemplary embodiment of the present invention, a thermal output (e.g., cold air output or a hot air output) from the A/C or heating units 101 may be increased or decreased to increase or decrease a temperature in a corresponding thermal region. For example, as illustrated in FIG. 3, a thermal output from a first A/C or heating unit 301 disposed in a first thermal region may be decreased and a thermal output from a second air A/C or heating units 311 may be increased, thus adjusting the temperatures in the first and second thermal regions in opposite directions. That is, the temperature may be adjusted in a first direction (e.g., increased or decreased) in the first thermal region and may be adjusted in a second direction opposite the first direction in the second thermal region. For example, it may be determined that the first individual 201 is wearing relatively warm clothing, and thus the temperature may be reduced in the region occupied by the first individual 201. It may also be determined that the second individual 202 is wearing relatively light clothing, and thus the temperature may be increased in the region occupied by the second individual 202. Alternatively, a relatively cold temperature in a first region and a relatively warm temperature in a second region may be maintained and an individual wearing relatively warm clothing may be assigned to the first region, while an individual wearing relatively light clothing may be assigned to the second region.

According to an exemplary embodiment of the present invention, a personal thermal comfort for each of the individuals may be determined, and the temperatures in each of the thermal regions may be adjusted based on the determined personal comfort levels, as described below in more detail. Alternatively, personal thermal comfort may be used to allocate individuals in rooms or spaces with multiple air conditioning or heating sources to maintain a desired degree of thermal comfort for individuals occupying such rooms or spaces.

Figure 4:
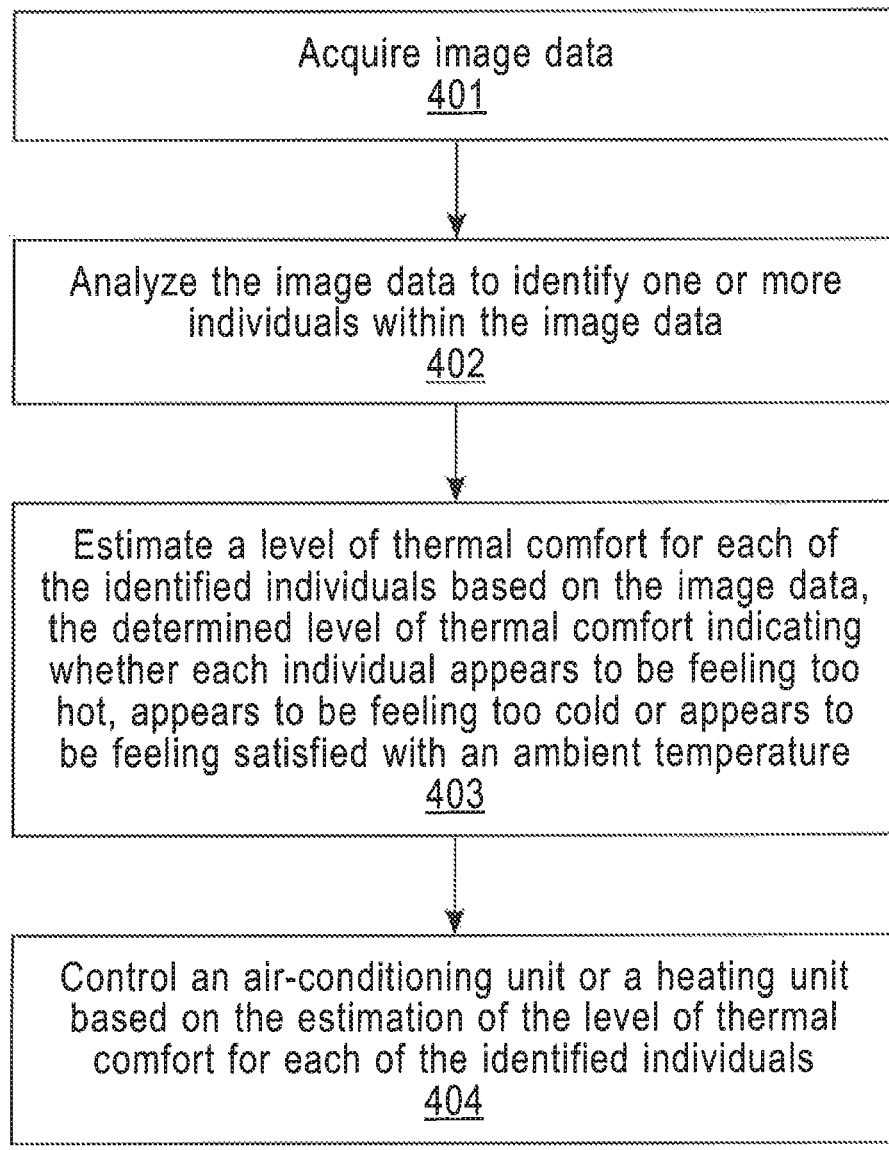
FIG. 4 is a flowchart illustrating a method of temperature control according to an exemplary embodiment of the present invention.

FIG. 4 is a flowchart illustrating a method of temperature control according to an exemplary embodiment of the present invention.

Referring to FIG. 4, exemplary embodiments of the present invention provide a method for temperature control including acquiring image data 401, and analyzing the image data to identify one or more individuals within the image data 402. Individuals may be identified by facial or body detection, using algorithms based on several descriptors, e.g. LBP (Local Binary Patterns), Haar-like features, HOG (Histograms of Oriented Gradients), and employing various classifiers, e.g., SVM (Support Vector Machines), Decision Trees, Deep Convolutional Networks. For example, image data may be analyzed using computer vision techniques, such as training a classifier, and the like. A level of thermal comfort is estimated for each of the identified individuals (e.g., the first individual 201 and the second individual 202) based on the image data. Possible approaches for clothing estimation may be based on skin amount detection (e.g., via color histograms computed in different color spaces) or based on training a deep classifier with a huge amount of clothing images collected on the Internet from on-line retail shops. It may be inferred from a video stream if people are uncomfortable with the current temperature according to their reactions (e.g., shaking on cold temperatures, perspiring on harm temperatures) and skin color variations (e.g., people with light skin may, present flushed cheeks when feeling hot). The determined level of thermal comfort indicates whether each individual appears to be feeling too hot, appears to be feeling too cold or appears to be feeling satisfied with an ambient temperature 403. An air-conditioning unit or a heating unit (e.g., A/C or heating unit 101) is controlled based on the estimation of the level of thermal comfort for each of the identified individuals 404.

According to an exemplary embodiment of the present invention the image data may be acquired using one or more cameras 102. A single camera may acquire image data for a particular thermal environment, or one or more cameras may be disposed in and may acquire image from each of the thermal regions. For example, each thermal region (e.g., thermal regions 103, 104 and 105) may include a separate camera 102, which may acquire image data in the respective one of the thermal regions.

According to an exemplary embodiment of the present invention, environmental data, such as temperature or humidity data may be acquired in each thermal region by one or more thermal comfort sensors 110. According to an exemplary embodiment of the present invention, each thermal region (e.g., thermal regions 103, 104 and 105) may include a separate thermal comfort sensor 110, which may acquire the environmental data in the respective one of the thermal regions.

According to an exemplary embodiment of the present invention the method for temperature control may include acquiring humidity data. The estimating the level of thermal comfort for each of the identified individuals may be performed based on the acquired humidity data in addition to the acquired image data.

According to an exemplary embodiment of the present invention the humidity data may be used to determine or confirm whether the individual is perspiring. Identification that an individual is perspiring may indicate that the individual is too hot. Alternatively, it may be determined that one or more individuals is shivering, which may be an indication that the individual is too cold.

According to an exemplary embodiment of the present invention estimating the level of thermal comfort for each of the identified individuals based on the image data may include segmenting the individual from the image data. Clothed surfaces and skin-exposed surfaces on the individual may be differentiated. A level of skin exposure of the individual may be calculated based on the differentiation between the clothed surfaces and the skin-exposed surfaces of the individual. It may be determined whether the individual appears to be dressed for a warm or cool temperature based on the calculated level of skin exposure. The level of thermal comfort of the individual may be estimated based on the determination as to whether the individual appears to be dressed for warm or cold temperature. Skin exposure may be calculated on images by analyzing color histograms in the HSV color space (which may be less sensitive to illumination changes).

According to an exemplary embodiment of the present invention types of clothing garments being worn by the individual may be determined from within the segmented image data of the individual. It may be determined whether the individual appears to be dressed for a warm or cool temperature based on the identified types of clothing garments being worn by the individual. The level of thermal comfort of the individual based may be estimated based on the determination as to whether the individual appears to be dressed for warm or cold temperature.

According to an exemplary embodiment of the present invention estimating the skin-exposed surfaces of the individual may be examined to identify the presence of perspiration or cutis anserine/horripilation. The level of thermal comfort of the individual may be estimated based on the identification of perspiration or cutis anserine/horripilation.

According to an exemplary embodiment of the present invention estimating the segmentation of the individual over a plurality of image frames may be analyzed. One or more observed actions of the individual may be characterized based on the analysis of the segmentation of the individual over the plurality of image frames. It may be determined whether any of the one or more observed actions of the individual are indicative of the individual feeling either too hot or too cold. The level of thermal comfort of the individual may be estimated based on the determination as to whether the individual appears to be feeling either too hot or too cold.

The temperature in each thermal region of a thermal environment may be increased, decreased, or held constant based on the determined level of thermal comfort of the individuals occupying the space.

According to an exemplary embodiment of the present invention controlling the A/C or heating unit 101 based on the estimation of the level of thermal comfort for each of the identified individuals may include calculating a group comfort score by averaging the level of individual thermal comfort for all of the one or more individuals identified within the image data. It may be determined whether the group comfort score is below a predetermined low threshold indicating that the one or more individuals are, on-average, feeling too cold or whether the group comfort score is above a predetermined high threshold indicating that the one or more individuals are, on-average, feeling too hot. The A/C or heating unit 101 may be controlled to raise the ambient temperature when it is determined that the group comfort score is below the predetermined low threshold, or controlling the air-conditioning unit or the heating unit to lower the ambient temperature when it is determined that the group comfort score is above the predetermined high threshold.

Figure 5:
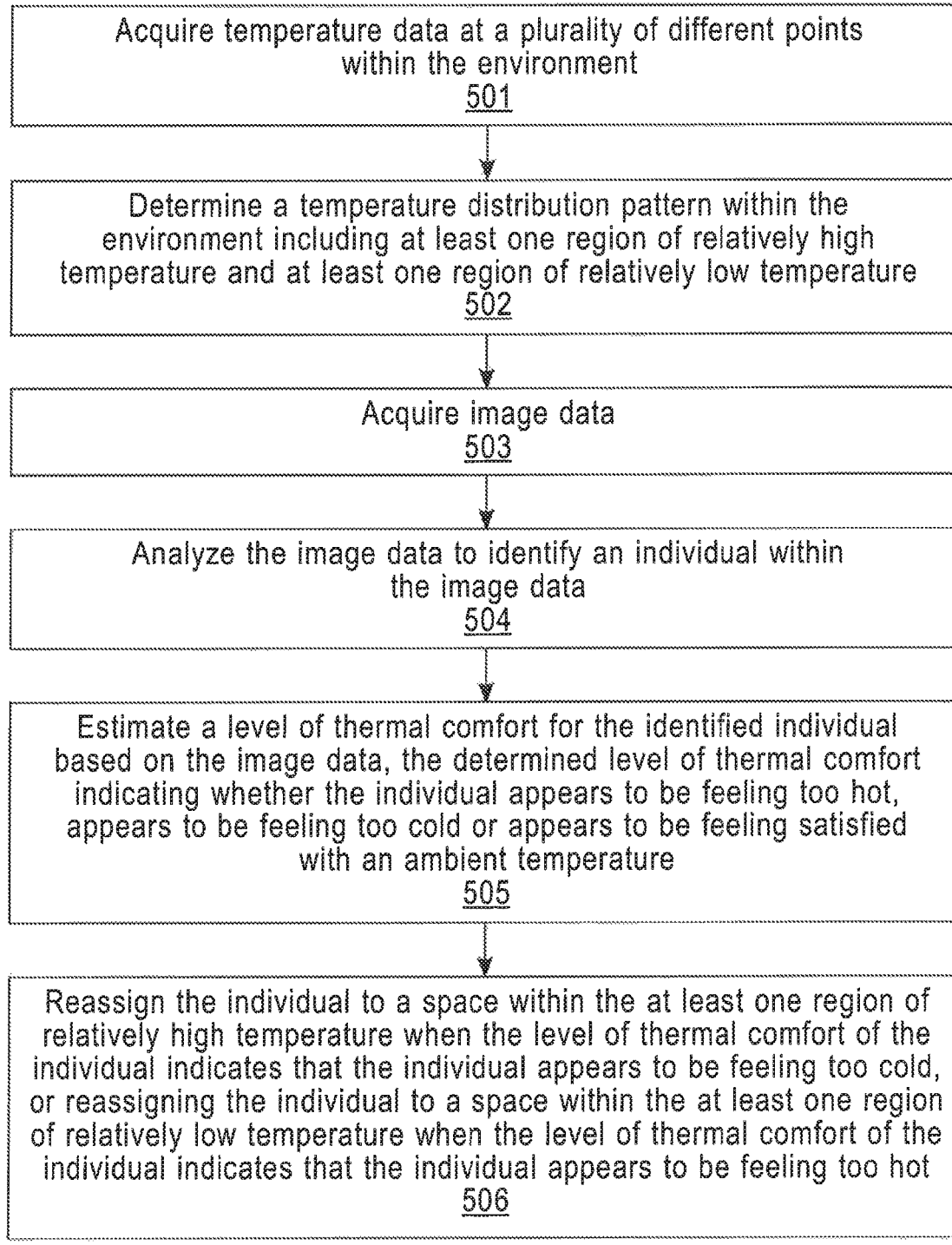
FIG. 5 is a flowchart illustrating a method of temperature control according to an exemplary embodiment of the present invention.

FIG. 5 is a flowchart illustrating a method of temperature control according to an exemplary embodiment of the present invention.

Referring to FIG. 5, exemplary embodiments of the present invention provide a method for temperature control within an environment (e.g., the thermal environment 100) including acquiring temperature data at a plurality of different points within the environment 501. A temperature distribution pattern within the environment including at least one region of relatively high temperature and at least one region of relatively low temperature is determined 502. Image data is acquired 503. The image data is analyzed to identify an individual (e.g. individuals 201 and/or 202) within the image data 504. A level of thermal comfort is estimated for the identified individual based on the image data, and the determined level of thermal comfort indicating whether the individual appears to be feeling too hot, appears to be feeling too cold or appears to be feeling satisfied with an ambient temperature 505. The individual is reassigned to a space within the at least one region of relatively high temperature when the level of thermal comfort of the individual indicates that the individual appears to be feeling too cold, or the individual is reassigned to a space within the at least one region of relatively low temperature when the level of thermal comfort of the individual indicates that the individual appears to be feeling too hot 506.

According to an exemplary embodiment of the present invention the method for temperature control may include controlling the A/C or heating units 101 based on the estimation of the level of thermal comfort for the identified individual.

According to an exemplary embodiment of the present invention controlling the A/C or heating units 101 based on the estimation of the level of thermal comfort for the identified individual may include determining whether the level of thermal comfort is below a predetermined low threshold indicating that the individual is feeling too cold or whether the level of thermal comfort is above a predetermined high threshold indicating that the individual is feeling too hot. The A/C or heating units 101 may be controlled to raise the ambient temperature when it is determined that the level of thermal comfort is below the predetermined low threshold, or the A/C or heating units 101 may be controlled to lower the ambient temperature when it is determined that the level of thermal comfort is above the predetermined high threshold.

According to an exemplary embodiment of the present invention reassigning the individual may include selecting a new workspace for the individual from among a list of available workspaces.

According to an exemplary embodiment of the present invention reassigning the individual may include selecting a new workspace for the individual and reassigning a second individual, already assigned to the new workspace, to another workspace.

According to an exemplary embodiment of the present invention the image data may be acquired using one or more cameras 102.

According to an exemplary embodiment of the present invention, environmental data, such as temperature or humidity data may be acquired in each thermal region by one or more thermal comfort sensors 110. According to an exemplary embodiment of the present invention, each thermal region (e.g., thermal regions 103, 104 and 105) may include a separate thermal comfort sensor 110, which may acquire the environmental data in the respective one of the thermal regions.

According to an exemplary embodiment of the present invention the method for temperature control may include acquiring humidity data. The estimating the level of thermal comfort for the identified individual may be performed based on the acquired humidity data in addition to the acquired image data.

According to an exemplary embodiment of the present invention the humidity data may be used to determine or confirm whether the individual is perspiring.

Figure 6:
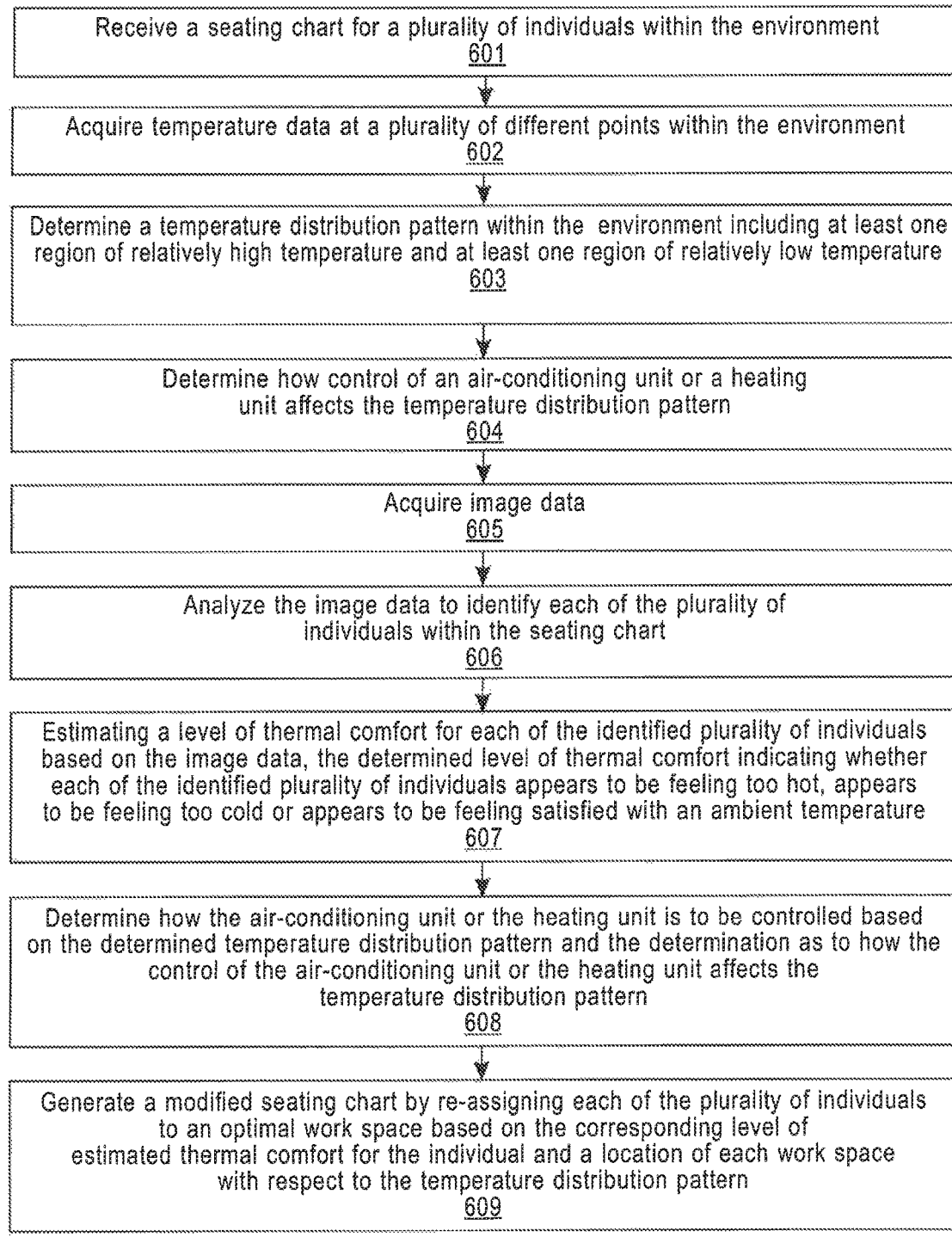
FIG. 6 is a flowchart illustrating a method of reassigning seating for individuals and controlling ambient temperatures within an environment according to an exemplary embodiment of the present invention.

FIG. 6 is a flowchart illustrating a method of reassigning seating for individuals and controlling ambient temperatures within an environment according to an exemplary embodiment of the present invention.

Referring to FIG. 6, exemplary embodiments of the present invention provide a method for reassigning seating for individuals and controlling ambient temperatures within an environment including receiving a seating chart for a plurality of individuals within the environment 601. Temperature data is acquired at a plurality of different points within the environment 602. A temperature distribution pattern is determined within the environment including at least one region of relatively high temperature and at least one region of relatively low temperature 603. How control of an air-conditioning unit or a heating unit affects the temperature distribution pattern is determined 604. Image data is acquired 605. The image data is analyzed to identify each of the plurality of individuals within the seating chart 606. A level of thermal comfort is estimated for each of the identified plurality of individuals based on the image data, and the determined level of thermal comfort indicating whether each of the identified plurality of individuals appears to be feeling too hot, appears to be feeling too cold or appears to be feeling satisfied with an ambient temperature 607. An optimized heating/cooling plan is generated. Generating the optimized heating/cooling plan includes determining how the air-conditioning unit or the heating unit is to be controlled based on the determined temperature distribution pattern and the determination as to how the control of the air-conditioning unit or the heating unit affects the temperature distribution pattern 608. A modified seating chart is generated by re-assigning each of the plurality of individuals to an optimal work space based on the corresponding level of estimated thermal comfort for the individual and a location of each work space with respect to the temperature distribution pattern 609.

According to an exemplary embodiment of the present invention estimating the level of thermal comfort for each of the identified individuals based on the image data may include segmenting the individual from the image data. Clothed surfaces and skin-exposed surfaces on the individual may be differentiated. A level of skin exposure of the individual may be calculated based on the differentiation between the clothed surfaces and the skin-exposed surfaces of the individual. It may be determined whether the individual appears to be dressed for a warm or cool temperature based on the calculated level of skin exposure. The level of thermal comfort of the individual may be estimated based on the determination as to whether the individual appears to be dressed for warm or cold temperature.

According to an exemplary embodiment of the present invention, determining the level of thermal comfort of the individual may include receiving a self-report assessment of personal thermal comfort (e.g., too hot, too cold, or comfortable). The self-report of personal thermal comfort may be used in assigning or reallocating the individual to an appropriate space, or to adjusting the temperature in the area which the person occupies.

According to an exemplary embodiment of the present invention, an assignment or reallocation of an individual to a particular space may be communicated to the individual through a video, audio or text message directed to an electronic device which is in relatively close proximity to the individual. For example, the message may be sent to the individual's Smartphone, or a computer terminal at or near the individual's workstation.

According to an exemplary embodiment of the present invention types of clothing garments being worn by the individual may be identified from within the segmented image data of the individual. It may be determined whether the individual appears to be dressed for a warm or cool temperature based on the identified types of clothing garments being worn by the individual. The level of thermal comfort of the individual may be estimated based on the determination as to whether the individual appears to be dressed for warm or cold temperature.

According to an exemplary embodiment of the present invention clothed surfaces and skin-exposed surfaces on the individual may be differentiated. The skin-exposed surfaces of the individual may be examined to identify the presence of perspiration or cutis anserine/horripilation. The level of thermal comfort of the individual may be estimated based on the identification of perspiration or cutis anserine/horripilation.

According to an exemplary embodiment of the present invention estimating the level of thermal comfort for each of the identified individuals based on the image data may include segmenting the individual from the image data. The segmentation of the individual over a plurality of image frames may be analyzed. One or more observed actions of the individual may be characterized based on the analysis of the segmentation of the individual over the plurality of image frames. It may be determined whether any of the one or more observed actions of the individual are indicative of the individual feeling either too hot or too cold. The level of thermal comfort of the individual may be estimated based on the determination as to whether the individual appears to be feeling either too hot or too cold.

Exemplary Image Processing Procedure

1. Pre-Processing

Thermal regions (e.g., the first thermal regions 103, the second thermal region 104 and the third thermal region 105) are detected in a captured image (e.g., captured by one or more cameras 102), and each region which is affected by each A/C or heating unit (e.g., A/C or heating unit 101) is identified.

2. Thermal Comfort Level Assessment

A set of devices (e.g., cameras 102 and/or thermal comfort sensors 110) capture images or videos from people within a rooms with multiple air conditioning sources (e.g., A/C or heating units 101). Collected media is submitted to a central server. Image recognition algorithms (e.g., skin surface area detection or detecting level of attire and thermal insulation of clothing) are applied to the captured images and videos. Individuals may be identified by facial or body detection, using algorithms based on several descriptors, e.g., LBP (Local Binary Patterns), Haar-like features, HOG (Histograms of Oriented Gradients), and employing various classifiers, e.g., SVM (Support Vector Machines), Decision Trees, Deep Convolutional Networks. Possible approaches for clothing estimation can be based on skin amount detection (e.g., via color histograms computed in different color spaces) or based on training a deep classifier with a relatively large amount of clothing images collected on the Internet from on-line retail shops. Examples of tasks performed by these algorithms are: skin detection: comparison of color histograms in various color spaces; and thermal insulation: track the person and compute his volume evolution in time. Each individual's clothing or attire level is compared with the configuration of each air conditioning device affecting the region the individual is occupying. The level of comfort each individual is estimated. For example, the level of thermal comfort for each individual is identified with regard to each detected temperature in each detected region.

3a. Resource Allocation

A position of all seating places in which individuals will be located is defined. The average temperature around each table is estimated based on the desired configuration for each air conditioning device. People are assigned to seating places in a way that maximizes the overall comfort level of individuals.

An optimal assignment can be identified by the Hungarian Algorithm, in which workers compose one set of vertices, seating places compose the other, and the weight of each edge represents the comfort level of each individual with each position according to the estimated temperature of that seating place.

3b. Temperature Adjustment

Temperature adjustment includes identifying if individuals in a certain region are uncomfortable with current temperature and adjusting air conditioning devices that change the temperature in that region in order to make it more appealing to individuals staying there.

Budget-Oriented Temperature Adjustment

Assignment of individuals to seating places may take into account that the energy consumption of all devices is subject to a given upper bound, defined by the budget allocated to expenses with air conditioning. Thus, individuals (e.g., employees of a business) may be assigned to different seating regions to reduce energy costs. Assignment of individuals to seating places may take into account that the energy consumption of all devices (e.g., climate control devices) should be minimum given a certain lower bound on the overall comfort level of the employees, defined by the budget allocated to expenses with air conditioning. That is, seating assignments may be made, or AC/heating units may be adjusted to reduce energy consumption, thus reducing energy costs. Algorithms addressing these problems, as well as variations of them, may be modeled as mixed-integer linear programs.

Figure 7:
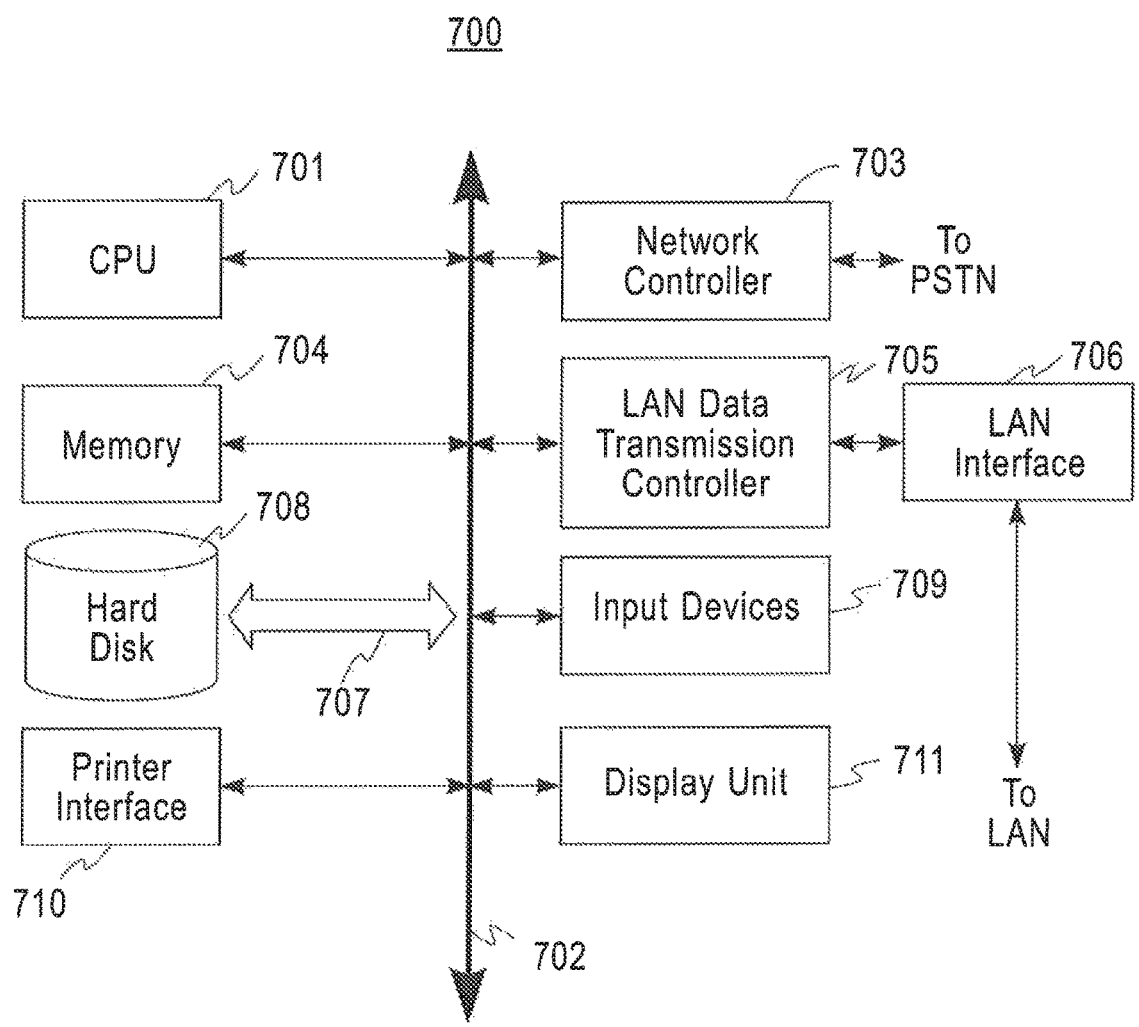
FIG. 7 illustrates an example of a computer system capable of implementing the methods according to exemplary embodiments of the present invention.

FIG. 7 illustrates an example of a computer system capable of implementing the methods according to exemplary embodiments of the present invention. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 700 may include, for example, a central processing unit (CPU) 701, random access memory (RAM) 704, a printer interface 710, a display unit 711, a local area network (LAN) data transmission controller 705, a LAN interface 706, a network controller 703, an internal bus 702, and one or more input devices 709, for example, a keyboard, mouse etc. As shown, the system 700 may be connected to a data storage device, for example, a hard disk, 708 via a link 707.

The descriptions of the various exemplary embodiments of the present invention have been presented for purposes of illustration, but are not intended to be exhaustive or limited to the exemplary embodiments disclosed. Many modifications and variations will be apparent to those of ordinary skill in the art without departing from the scope and spirit of the described exemplary embodiments. The terminology used herein was chosen to best explain the principles of the exemplary embodiments, or to enable others of ordinary skill in the art to understand exemplary embodiments described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and/or block diagrams in the figures illustrate the architecture, functionality, and operation of possible implementations of systems, methods, and computer program products according to various exemplary embodiments of the invention. In this regard, each block in the flowchart or block diagrams may represent a module, segment, or portion of instructions, which comprises one or more executable instructions for implementing the specified logical function(s). In alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown and described with reference to exemplary embodiments thereof, it will be understood by those of ordinary skill in the art that various changes in form and detail may be made therein without departing from the spirit and scope of the present invention as defined by the following claims.

The invention claimed is:

1. A method for temperature control, comprising:
   acquiring image data, wherein the image data is color image data;
   analyzing the image data to identify one or more individuals within the image data;
   estimating a level of thermal comfort for each of the identified individuals based on the image data, the estimated level of thermal comfort indicating whether each individual appears to be feeling too hot, appears to be feeling too cold or appears to be feeling satisfied with an ambient temperature; and
   controlling an air-conditioning unit or a heating unit based on the estimated level of thermal comfort for each of the identified individuals,
   wherein estimating the level of thermal comfort for each of the identified individuals based on the image data, comprises:
   segmenting an individual of the identified individuals from the image data;
   differentiating between clothed surfaces and skin-exposed surfaces on the individual from the image data using one or more computer vision techniques;
   examining the skin-exposed surfaces of the individual from the image data to identify the presence of cutis anserine or horripilation; and
   estimating the level of thermal comfort of the individual based on the identification of cutis anserine or horripilation.

2. The method of claim 1, wherein the image data is acquired using one or more security cameras.

3. The method of claim 1, additionally comprising acquiring humidity data, wherein the estimating the level of thermal comfort for each of the identified individuals is performed based on the acquired humidity data in addition to the acquired image data.

4. The method of claim 3, wherein the humidity data is used to determine or confirm whether the individual is perspiring based on a humidity level above a predetermined threshold.

5. The method of claim 1, wherein estimating the level of thermal comfort for each of the identified individuals based on the image data, comprises:
   calculating a level of skin exposure of the individual based on the differentiation between the clothed surfaces and the skin-exposed surfaces of the individual;
   determining whether the individual appears to be dressed for a warm or cool temperature based on the calculated level of skin exposure; and
   estimating the level of thermal comfort of the individual based on the determination as to whether the individual appears to be dressed for warm or cold temperature.

6. The method of claim 1, wherein estimating the level of thermal comfort for each of the identified individuals based on the image data, comprises:
   segmenting the individual from the image data;
   identifying types of clothing garments being worn by the individual from within the segmented image data of the individual;
   determining whether the individual appears to be dressed for a warm or cool temperature based on the identified types of clothing garments being worn by the individual; and
   estimating the level of thermal comfort of the individual based on the determination as to whether the individual appears to be dressed for warm or cold temperature.

7. The method of claim 1, wherein estimating the level of thermal comfort for each of the identified individuals based on the image data further comprises examining the skin-exposed surfaces of the individual to identify the presence of perspiration.

8. The method of claim 1, wherein estimating the level of thermal comfort for each of the identified individuals based on the image data, comprises:
- segmenting the individual from the image data;
- analyzing the segmentation of the individual over a plurality of image frames;
- characterizing one or more observed actions of the individual based on the analysis of the segmentation of the individual over the plurality of image frames;
- determining whether any of the one or more observed actions of the individual are indicative of the individual feeling either too hot or too cold; and
- estimating the level of thermal comfort of the individual based on the determination as to whether the individual appears to be feeling either too hot or too cold.

9. The method of claim 1, wherein controlling the air-conditioning unit or the heating unit based on the estimation of the level of thermal comfort for each of the identified individuals, comprises:
- calculating a group comfort score by averaging the level of individual thermal comfort for all of the one or more individuals identified within the image data;
- determining whether the group comfort score is below a predetermined low threshold indicating that the one or more individuals are, on-average, feeling too cold or whether the group comfort score is above a predetermined high threshold indicating that the one or more individuals are, on-average, feeling too hot; and
- controlling the air-conditioning unit or the heating unit to raise the ambient temperature when it is determined that the group comfort score is below the predetermined low threshold, or controlling the air-conditioning unit or the heating unit to lower the ambient temperature when it is determined that the group comfort score is above the predetermined high threshold.

10. A method for temperature control within an environment, comprising:
- acquiring temperature data at a plurality of different points within the environment;
- determining a temperature distribution pattern within the environment including at least one region of relatively high temperature and at least one region of relatively low temperature;
- acquiring image data, wherein the image data is color image data;
- analyzing the image data to identify an individual within the image data;
- estimating a level of thermal comfort for the identified individual based on the image data, the estimated level of thermal comfort indicating whether the individual appears to be feeling too hot, appears to be feeling too cold or appears to be feeling satisfied with an ambient temperature,
- wherein estimating the level of thermal comfort for each of the identified individual based on the image data, comprises:
  - segmenting an individual of the identified individuals from the image data;
  - differentiating between clothed surfaces and skin-exposed surfaces on the individual from the image data using one or more computer vision techniques;
  - examining the skin-exposed surfaces of the individual from the image data to identify the presence of cutis anserine or horripilation; and
  - estimating the level of thermal comfort of the individual based on the identification of cutis anserine or horripilation; and
- reassigning the individual to a space within the at least one region of relatively high temperature when the level of thermal comfort of the individual indicates that the individual appears to be feeling too cold, or reassigning the individual to a space within the at least one region of relatively low temperature when the level of thermal comfort of the individual indicates that the individual appears to be feeling too hot.

11. The method of claim 10, further comprising controlling an air-conditioning unit or a heating unit based on the estimation of the level of thermal comfort for the identified individual.

12. The method of claim 11, wherein controlling the air-conditioning unit or the heating unit based on the estimation of the level of thermal comfort for the identified individual, comprises:
- determining whether the level of thermal comfort is below a predetermined low threshold indicating that the individual is feeling too cold or whether the level of thermal comfort is above a predetermined high threshold indicating that the individual is feeling too hot; and
- controlling the air-conditioning unit or the heating unit to raise the ambient temperature when it is determined that the level of thermal comfort is below the predetermined low threshold, or controlling the air-conditioning unit or the heating unit to lower the ambient temperature when it is determined that the level of thermal comfort is above the predetermined high threshold.

13. The method of claim 10, wherein reassigning the individual includes selecting a new workspace for the individual from among a list of available workspaces.

14. The method of claim 10, wherein reassigning the individual includes selecting a new workspace for the individual and reassigning a second individual, already assigned to the new workspace, to another work space.

15. The method of claim 10, wherein the image data is acquired using one or more security cameras.

16. The method of claim 10, additionally comprising acquiring humidity data, wherein the estimating the level of thermal comfort for the identified individual is performed based on the acquired humidity data in addition to the acquired image data.

17. The method of claim 16, wherein the humidity data is used to determine or confirm whether the individual is perspiring based on a humidity level above a predetermined threshold.

18. A method for reassigning seating for individuals and controlling ambient temperatures within an environment, comprising:
- receiving a seating chart for a plurality of individuals within the environment;
- acquiring temperature data at a plurality of different points within the environment;
- determining a temperature distribution pattern within the environment including at least one region of relatively high temperature and at least one region of relatively low temperature;
- determining how control of an air-conditioning unit or a heating unit affects the temperature distribution pattern;

acquiring image data, wherein the image data is color image data;

analyzing the image data to identify each of the plurality of individuals within the seating chart;

estimating a level of thermal comfort for each of the identified plurality of individuals based on the image data, the estimated level of thermal comfort indicating whether each of the identified plurality of individuals appears to be feeling too hot, appears to be feeling too cold or appears to be feeling satisfied with an ambient temperature, wherein estimating the level of thermal comfort for each of the identified individuals based on the image data, comprises:

segmenting an individual of the identified individuals from the image data;

differentiating between clothed surfaces and skin-exposed surfaces on the individual from the image data using one or more computer vision techniques;

examining the skin-exposed surfaces of the individual from the image data to identify the presence of cutis anserine or horripilation; and estimating the level of thermal comfort of the individual based on the identification of cutis anserine or horripilation; and generating an optimized heating/cooling plan including:

determining how the air-conditioning unit or the heating unit is to be controlled based on the determined temperature distribution pattern and the determination as to how the control of the air-conditioning unit or the heating unit affects the temperature distribution pattern; and generating a modified seating chart by re-assigning each of the plurality of individuals to an optimal work space based on the corresponding level of estimated thermal comfort for the individual and a location of each work space with respect to the temperature distribution pattern.

19. The method of claim 18, wherein estimating the level of thermal comfort for each of the identified individuals based on the image data, comprises:

calculating a level of skin exposure of the individual based on the differentiation between the clothed surfaces and the skin-exposed surfaces of the individual;

determining whether the individual appears to be dressed for a warm or cool temperature based on the calculated level of skin exposure; and estimating the level of thermal comfort of the individual based on the determination as to whether the individual appears to be dressed for warm or cold temperature.

20. The method of claim 18, wherein estimating the level of thermal comfort for each of the identified individuals based on the image data, comprises:

identifying types of clothing garments being worn by the individual from within the segmented image data of the individual;

determining whether the individual appears to be dressed for a warm or cool temperature based on the identified types of clothing garments being worn by the individual; and estimating the level of thermal comfort of the individual based on the determination as to whether the individual appears to be dressed for warm or cold temperature.

21. The method of claim 18, wherein estimating the level of thermal comfort for each of the identified individuals based on the image data further comprises examining the skin-exposed surfaces of the individual to identify the presence of perspiration.

22. The method of claim 18, wherein estimating the level of thermal comfort for each of the identified individuals based on the image data, comprises:

analyzing the segmentation of the individual over a plurality of image frames;

characterizing one or more observed actions of the individual based on the analysis of the segmentation of the individual over the plurality of image frames;

determining whether any of the one or more observed actions of the individual are indicative of the individual feeling either too hot or too cold; and estimating the level of thermal comfort of the individual based on the determination as to whether the individual appears to be feeling either too hot or too cold.

* * * * *